Jan. 23, 1968   M. GINSBURG   3,365,211
ADJUSTABLE WHEEL BOGIE ARRANGEMENT FOR TRAILERS
Filed Jan. 27, 1966   2 Sheets-Sheet 1

INVENTOR.
MILTON GINSBURG
BY
Seidel & Gonda
ATTORNEYS.

INVENTOR.
MILTON GINSBURG

BY *Seidel & Gonda*

ATTORNEYS.

United States Patent Office 3,365,211
Patented Jan. 23, 1968

3,365,211
ADJUSTABLE WHEEL BOGIE ARRANGEMENT
FOR TRAILERS
Milton Ginsburg, c/o Gindy Farm, West Chester,
Pa. 19380
Filed Jan. 27, 1966, Ser. No. 523,323
4 Claims. (Cl. 280—81)

ABSTRACT OF THE DISCLOSURE

A trailer having adjustable wheel bogies is described, wherein the bogie frame is adjustable along the length of the body of the semi-trailer by means of novel roller containing bearing pads located between the bogie frame and a sliding rail of the trailer, and the bogie frame is releasably attached to the trailer by pins received through the bogie frame and the trailer member.

---

This invention relates to trailers, and more particularly to trailers having adjustable wheel bogies.

Trailers are generally classified into three different types depending upon the manner in which the weight is supported. The first type is a semitrailer wherein a large proportion of the weight is supported by the connection to the towing vehicle and the remainder is supported by the wheels of the semitrailer. Another type is a three-quarter trailer wherein the weight is mostly balanced on and supported by the trailer wheels and any unbalanced weight is supported by the connection to the towing vehicle. The last type of trailer is a full trailer wherein the entire weight is supported by trailer wheels. The present invention is particularly adapted for use in connection with semitrailers and the principles of the present invention may be adopted for use with other types of trailers as desired. Hence, for the purposes of a complete disclosure, the present invention will be described in detail in connection with a semitrailer.

A semitrailer has bogies adjustably connected thereto so that the position of the wheels may be adjusted along the length of the body of the semitrailer. Such adjustment is desired in order to change the position of the wheels which may be dictated by the weight or load carried by the body, road conditions, regulations with respect to vehicles, etc. Heretofore, the semitrailer frame has been spaced from the bogie frame by bearing pads, or rollers mounted on through shafts.

When it is desired to change the position of the wheels, the friction between the bearing pads and the slide rails of the semitrailer body has been so great so as to sometimes physically lock the parts together. The force necessary to separate these components has at times been sufficient so as to actually cause the drive axle from the cab to snap. In accordance with the present invention, the bearing pads are provided with rollers. The rollers are not mounted for rotation about the axis of shafts connected thereto but rather are merely sections of round metal stock which are capable of being removed from the pad whenever desired. The rollers act as a device which reduces or breaks the static friction between the trailer body of the bogie which would normally occur when the semitrailer has a heavy load and facilitate movement of the bogie when it is desired to change the axle setting. When desired, the rollers may be removed and the bearing pad will function in a normal manner as a sliding pad.

It is an object of the present invention to provide a novel bearing support for the body of a trailer.

It is another object of the present invention to provide a convertible bearing support for the body of a semi-trailer.

It is another object of the present invention to provide a novel bearing structure between the body and bogie of a trailer.

It is another object of the present invention to provide bearing structure which reduces or breaks static friction between a bogie and a body of a semitrailer.

It is still another object of the present invention to provide novel bearing structure for use in trailers which is simple, reliable, and inexpensive to manufacture while at the same time capable of being incorporated into existing vehicles.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a semi-trailer designated generally as 10.

Figure 1:
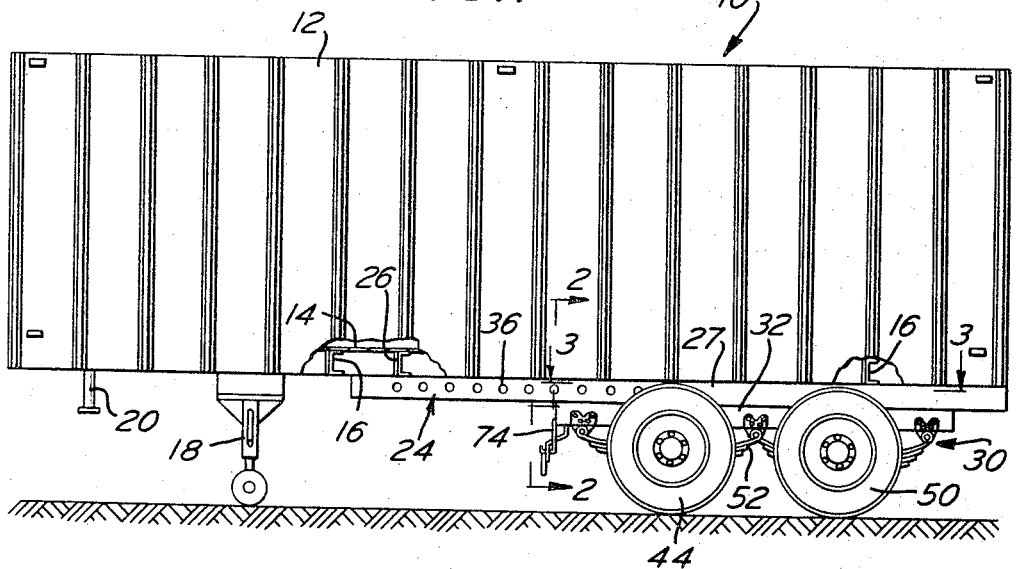
FIGURE 1 is a side elevation view of a semitrailer.

Semitrailer 10 includes a body designated generally as 12. The body may be made from any one of a wide variety of materials and may be entirely of conventional construction. The body 12 includes a floor 14 mounted on a plurality of transversely extending cross members 16. Cross members 16 as illustrated are C-shaped in cross section and extend transversely across the floor 14 at spaced points therealong. The semitrailer 10 includes conventional landing gear 18 and a conventional king pin 20 for connection to a cab or other towing vehicle. The body for semitrailer 10 includes longitudinally extending parallel slide rails 22 and 24. Slide rail 22 is angle-shaped with a horizontally disposed portion 21 and a vertically disposed portion 23. Slide rail 24 includes a horizontally disposed portion 25 and a vertically disposed portion 27.

Slide rail 24 is connected to the cross members 16 by a plurality of mounting plates 26 corresponding in number to the number of members 16. A similar number of mounting plates 28 interconnect the slide rail 22 with the cross members 16. The body of the semitrailer 10 is adjustably connected to a bogie frame designated generally as 30.

The bogie frame 30 includes a frame member 32 which reciprocally supports a pin 34. Pin 34 is adapted to extend through one of a plurality of holes 36. The holes 36 are provided at incremental positions along the length of the vertical portion 27 on the slide rail 24. The bogie frame 30 includes another frame member 38 which supports a corresponding pin 40 which is adapted to extend through corresponding holes in the vertical portion 23 of the slide rail 22.

The bogie includes wheels 44 in tandem on axle 46 and wheels 50 in tandem on axle 48. A conventional leaf spring suspension 52 may be provided for the axles. The frame members 32 and 38 are preferably interconnected by a plurality of struts 54.

Figure 3:
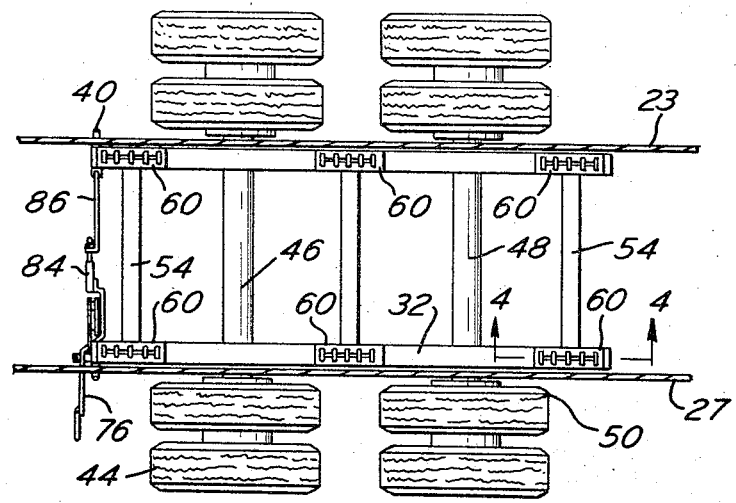
FIGURE 3 is a sectional view taken along the line 3—3 in FIGURE 1.
Figure 4:
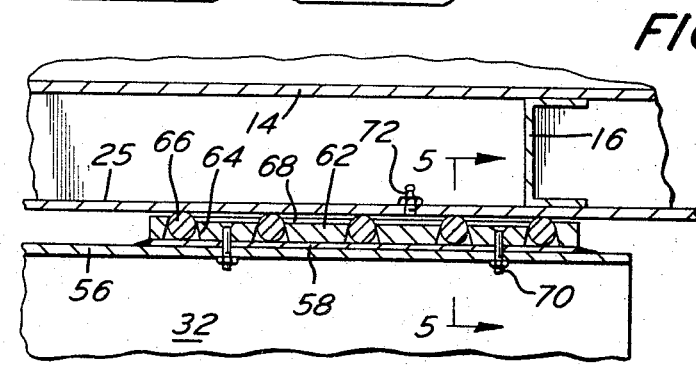
FIGURE 4 is a sectional view taken along the line 4—4 in FIGURE 3.
Figure 5:
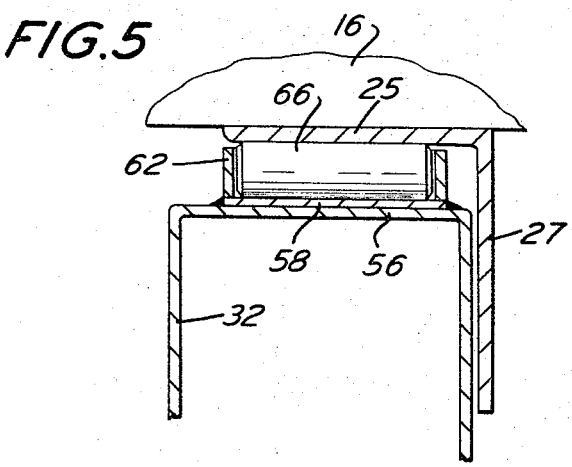
FIGURE 5 is a sectional view taken along the line 5—5 in FIGURE 4.
Figure 6:
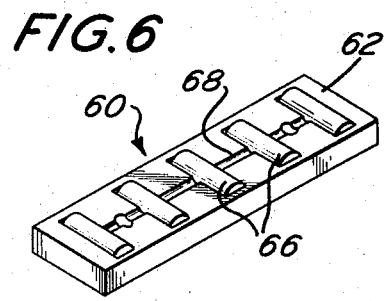
FIGURE 6 is a perspective view of the bearing pad.

As shown more clearly in FIGURES 4 and 5, a bearing strip 58 is welded or otherwise secured to the upper wall 56 of the frame member 32 at spaced points therealong. Three such strips are provided in the illustrated embodiment. Likewise, a corresponding number of bearing strips are provided on the top wall of the frame member 38. A bearing pad designed generally as 60 overlies each one of the bearing strips 58. As shown more clearly in FIGURE 3, a total of six bearing pads are provided. This number may be increased or decreased as desired.

The bearing pad 60 includes a body 62. Body 62 is provided with a plurality of parallel tapered slots 64. The sides of the slots 64 converge upwardly toward the plane of the horizontally disposed portion 25. The slots 64 extend transversely across the bearing pad 60 at spaced points therealong. As illustrated, five such slots are provided. This number may be increased or decreased as desired.

A roller 66 is provided in each slot. Roller 66 is preferably formed by cutting off uniform lengths of bar stock. In this manner, a very inexpensive roller may be rapidly produced for use with the bearing pad 60 to accomplish the purposes of the present invention. The rollers 66 have a length which is substantially equal but slightly shorter than the length of the slots 64. The diameter of the rollers 64 is preferably chosen so as to enable the rollers to be in contact with the upper surface on the bearing strip 58 and project slightly beyond the upper surface of the bearing pad 60 by a distance such as one-sixteenth to one-eighth of an inch.

The bearing pads 60 are removably coupled to the frame members 32 and 38 by bolts 70. A grease groove 68 is preferably provided in the upper surface of the bearing pads 60 and a grease fitting 72 is provided in the horizontally disposed portion 25 of the slide rail 24. In this manner, it will be noted that the rollers 66 are readily removable when desired or when not required. When the rollers 66 are utilized in the manner illustrated in the various figures of the drawing, the rollers will prevent any tendency of the slide rails 22 and 24 becoming frictionally locked to the bearing pads.

Figure 2:
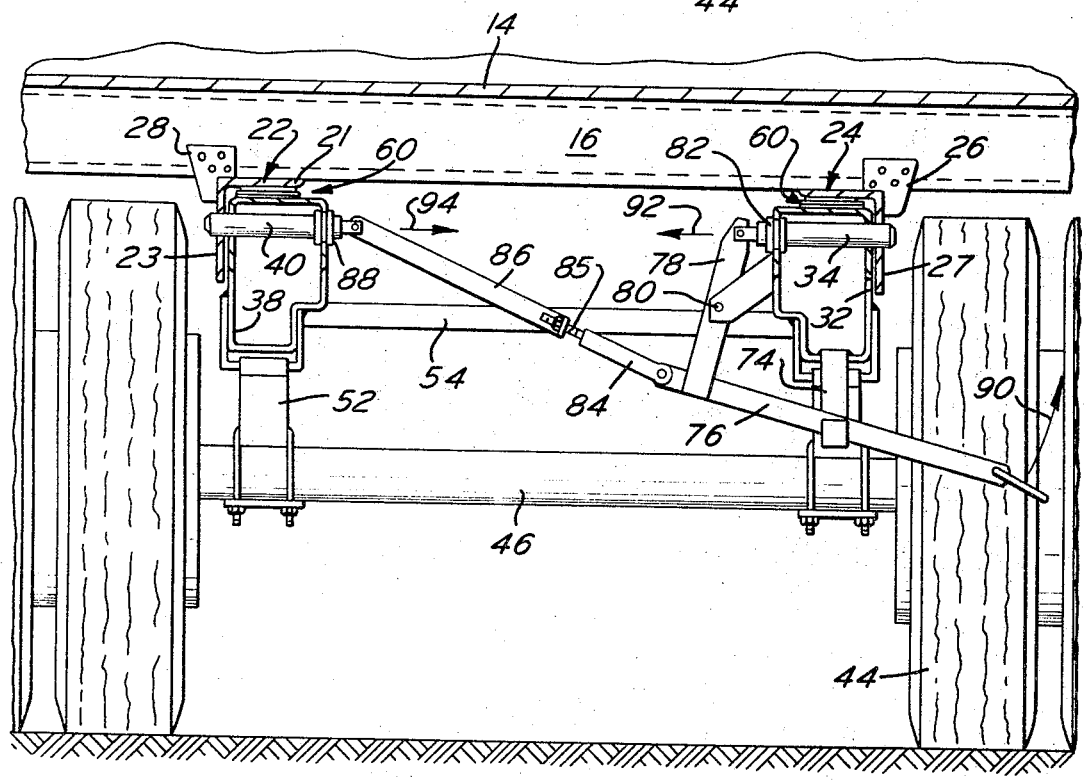
FIGURE 2 is a sectional view taken along the line 2—2 in FIGURE 1.

In order to simultaneously remove the pins 34 and 40, an actuating mechanism is provided. The actuating mechanism includes a handle 76 supported by a handle retainer 74 which in turn is connected to one end of the frame member 32. The handle 76 includes an arm pivotably coupled to a bracket on the frame member 32 for rotation about the axis of pin 80. One end of arm 78 is integral with handle 76. The other end of arm 78 is pivotably connected to one end of the pin 34. The pin 34 extends through a spring retainer housing 82 containing a spring which biases the pin 34 to the position illustrated in FIGURE 2.

A yoke 84 has one end pivotably connected to the handle 76. The other end of yoke 84 is connected to one end of a link 86 by means of a threaded bolt 85. The other end of link 86 is pivotably connected to one end of the pin 40. The pin 40 also extends through a spring retainer housing 88 containing a spring which biases the pin 40 to the position illustrated.

When manual force is applied to the handle 76 in the direction of arrow 90, pin 34 is moved against its spring in the direction of arrow 92 and pin 40 is moved against its spring in the direction of arrow 94. With the pins 34 and 40 removed from the position shown in FIGURE 2 so that the pins no longer extend through the vertical portions 23 and 27 on the slide rails, and with the brakes for the wheels 44 and 50 locked, it is possible to cause the towing vehicle to move the body 12 with respect to the bogie frame 30 to the desired position. Thereafter, the handle 76 is moved to the position illustrated in FIGURE 2 wherein the pins 34 and 36 will again extend through axially aligned holes in the vertical portions 23 and 27 of the slide rails 22 and 24 respectively. The bearing pads 60 and the rollers 66 will prevent any static friction tending to lock the slide rails to the bogie frame. Whenever desired, the rollers 66 may be removed.

The diameter of the rollers 66 is only slightly greater than the thickness of the bearing pads, such as one-sixteenth of an inch, so that the slide rails 22 and 24 will be supported by the upper surface of the bearing pads and the rollers with the rollers being a safety feature to prevent static friction locking. While the rollers 66 are illustrated as cylinders, it would be within the scope of the present invention to substitute spherical balls with correspondingly shaped slots in the bearing pads.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for use in conjunction with trailers and for disposal between a bogie frame and slide rails on a trailer body comprising a bearing pad, said bearing pad having a plurality of substantially parallel slots, each slot receiving a cylinder of bar stock, each cylinder having a diameter slightly greater than the thickness of said bearing pad, and each cylinder being removably disposed within a slot, and means for removably connecting the bearing pad to a bogie frame and for retaining the cylinders within their respective slots.

2. Apparatus comprising a trailer body having longitudinally extending slide rails adjustably supported by a bogie frame having wheels, at least one bearing pad between each slide rail and the bogie frame, said bearing pads having transversely extending tapered slots and rollers disposed within each slot in rolling engagement with a juxtaposed portion of the slide rails, said rollers being cylindrically shaped with the diameter of each roller being greater than the thickness of the bearing pad, whereby said rollers within said slots each project to a height above the uppermost surface of said bearing pads.

3. Apparatus in accordance with claim 2 including grease grooves on the upper surface of the bearing pads extending between adjacent slots.

4. Apparatus in accordance with claim 2 including a bearing strip for each bearing pad, each bearing strip being fixedly secured to the uppermost surface of the bogie frame and supporting the rollers of its respective pad, and each bearing pad overlying a bearing strip.

References Cited

UNITED STATES PATENTS

| 1,568,362 | 1/1926 | Brown. | |
| 2,202,792 | 5/1940 | Gothberg | 308—217 X |
| 2,330,154 | 9/1943 | Stabinski | 308—6 |
| 2,589,678 | 3/1952 | De Lay | 280—34 |
| 2,900,194 | 8/1959 | De Lay | 280—34 |
| 2,962,295 | 11/1960 | Tenebaum | 280—81 |

FOREIGN PATENTS

| 1,170,612 | 9/1958 | France. |

KENNETH H. BETTS, *Primary Examiner.*